UNITED STATES PATENT OFFICE.

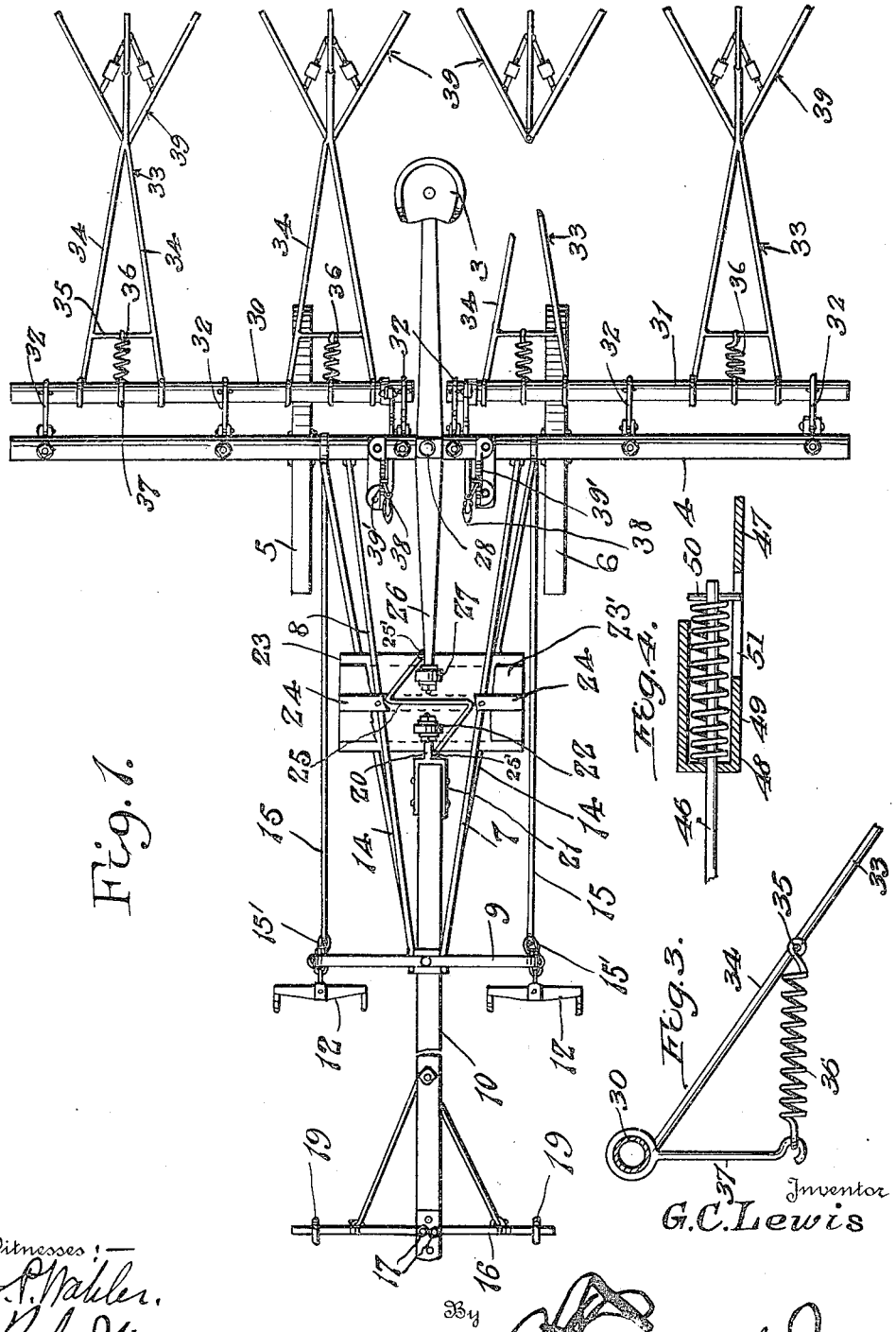

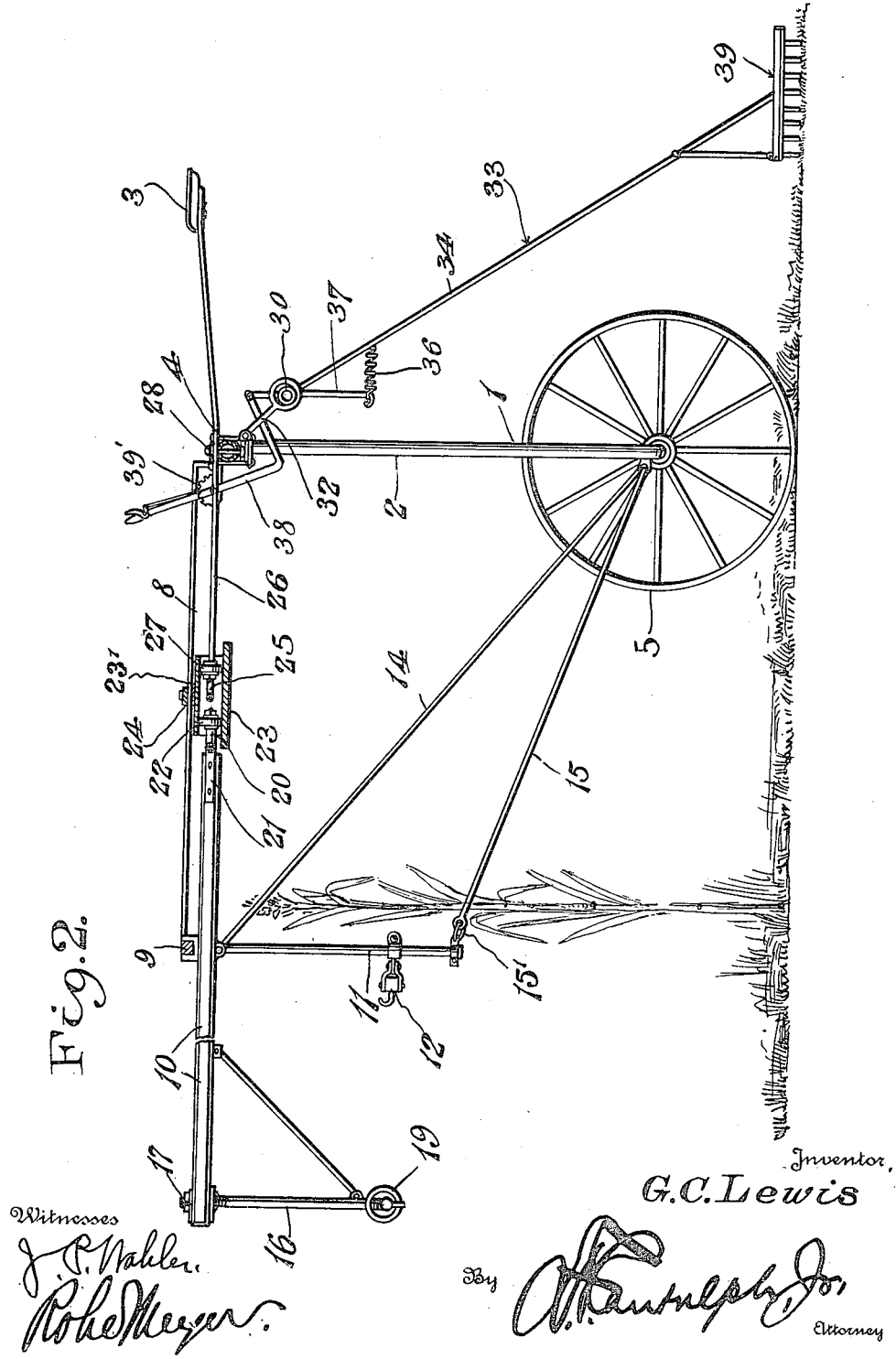

GEORGE C. LEWIS, OF CEDAR, KANSAS.

CULTIVATOR.

1,204,287.  Specification of Letters Patent.  Patented Nov. 7, 1916.

Application filed August 7, 1914. Serial No. 855,661.

*To all whom it may concern:*

Be it known that I, GEORGE C. LEWIS, a citizen of the United States, residing at Cedar, in the county of Smith and State of Kansas, have invented certain new and useful Improvements in Cultivators; and I do hereby declare the following to be a full, clear, and exact description of the invention, such as will enable others skilled in the art to which it appertains to make and use the same.

This invention relates to agricultural implements and more particularly to a cultivator for the cultivation of corn, and the primary object of the invention is the provision of a cultivator as specified, which is constructed for the purpose of cultivating the corn after the same reaches a height which renders it incapable of cultivation with the ordinary type of cultivator now commonly in use.

Another object of this invention is the provision of a cultivator as specified which has an extraordinarily high frame and which has suspended rearwardly from the frame a plurality of cultivating elements.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1. is a top plan view of the improved cultivator, and Fig. 2 is a central longitudinal sectional view through the improved cultivator, Fig. 3 is a detail fragmentary view of a part of the cultivator showing the manner of yieldably attaching the cultivating element to the frame. Fig. 4 is a detail sectional view of the yieldable braces for the cultivating element.

Referring more particularly to the drawings, 1 designates the supporting axle of the cultivator, which is formed in the usual manner, chiefly a U-shaped or arched axle, the arch 2 of which is exaggerated, so as to position the seat 3 and various cultivating operating mechanisms at an increased elevation with respect to ordinary cultivators, so that the cultivator may be employed for the cultivation of corn after the same reaches a height which would render it incapable of cultivation with the ordinary type of cultivator employed for this purpose.

The axle arch 2 has a supporting cross bar 4 secured to its upper end, which cross bar projects laterally of the traction wheels 5 and 6, which are mounted upon the hubs or axle portions proper of the axle 1.

The supporting cross bar 4 has braces 7 and 8 secured thereto, which braces extend forwardly from the cross bar and have an evener 9 secured to their forward ends, which evener is also pivotally connected to the tongue 10. The evener 9 has depending legs 11, which extend downwardly from the tongue 10, and which have the ordinary type of swingle trees 12 swivelly connected to their lower ends so as to provide for the hitching of horses thereto for the traction of the cultivator. The legs 11 of the evener 9 have brace rods 14 and 15 secured thereto and to the axle 1, the brace 14 being secured to the upper edge of the legs immediately beneath the tongue 10, while the brace rods 15 are secured to the lower end of the legs 11 by links 15′ as is clearly shown in Fig. 2 of the drawings.

The tongue 10 has a neck yoke 16 secured to the forward end thereof. The neck yoke 16 is secured to the tongue 10 by bolts 17, which bolts extend vertically through the tongue and through the apex 18 of the neck yoke 16. The neck yoke 16 is formed of a bar which is bent to form substantially an inverted V-shape, so as to position the rings 19, to which the hame straps are attached, beneath the tongue so as to be conveniently attached to the hame straps for properly positioning the tongue for the guiding of the cultivator so that it will be out of the way of the stalks of corn which are being cultivated.

The inner end of the tongue 10 has a rod 20 secured thereto and projecting rearwardly therefrom, which rod is secured to the end of the tongue in any suitable manner such as by a bracket 21. The rod 20 has a roller 22 rotatably mounted thereupon, which roller engages the upper surface of a guiding plate 23. The guide plate 23 is supported by the brace rods 7 and 8 and by a bracket 24 which is secured to the brace rods and depends therefrom. A second plate 23′ is supported above the plate 23 and parallel thereto, and it is provided for preventing the rollers 22 and 27 from pointing upwardly through sections of the cultivator. The tongue 10 has link connection, through a bent rod 25, with the bar 26. The bar 26 has a roller 27 mounted upon its end, which roller engages the upper surface of the guide plate 23 so as to eliminate the friction which would be occasioned by the passage of the bar over the surface of the guideway. The bent rod 25 has pivotal or hinged connection as at 25' to the bar 26 so as to permit of the necessary movement of the rod for the proper sliding of the tongue by the movement of the seat. The bar 26 extends rearwardly from the guideway 23 and the tongue and it is pivotally connected at 28 to the cross bar 4, depending rearwardly from the cross piece and having the seat 3 mounted upon its rear end. The connection of the bar 26 to the tongue as specified is provided so that when it is desired to move the tongue for the guiding of the same along the row of corn, all that is necessary is to move the seat in pivotal or oscillatory manner, which will impart similar motion to the tongue and efficiently guide the same during the operation of the cultivator.

The cross bar 4 has rods 30 and 31 suspended rearwardly therefrom and supported by rods 32, which latter rods are pivotally connected to the frame and cross bar 4 and are rigidly connected to the rods 30 and 31. The rods 30 and 31 extend transversely across the line of travel of the cultivator and are parallel with the cross piece 4. The rods 30 and 31 have a cultivating element supporting frame 33 secured thereto, which cultivating element supporting frame consists of a pair of converging rods 34, which are braced intermediate their ends by cross rods 35. The cross rods 35 have spiral springs 36 connected thereto, which spiral springs are in turn connected to hooks 37, which hooks are mounted upon the rods 30 and 31 and depend therefrom as is clearly shown in Fig. 3 of the drawings.

Lifting levers 38 are pivotally connected to the supporting frame of the cultivator and they have mechanism associated therewith which coacts with the quadrant 39'. The levers 38 are connected to the rods 30 and 31, so that the rods may be operated for raising or lowering the cultivating element 39, into or out of a ground cultivating position, as is desired.

From the foregoing description taken in connection with the accompanying drawings the advantages of the construction and of the method of operation of the improved cultivator will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cultivator, a U-shaped supporting axle having an arch of exaggerated height so as to pass over tall corn, a cross bar connected to said arch, a plurality of cultivating element supporting bars supported by said cross bar and positioned rearwardly and downwardly therefrom, a plurality of cultivating elements supported by said cross bar, and means for raising and lowering said cultivating element supporting bars for moving said cultivating elements into or out of an operative position.

2. In a cultivator, the combination, of a U-shaped axle having an arch of exaggerated height, a cross bar connected to said arch, a plurality of rods pivotally connected to said cross bar, a plurality of cultivating element supporting rods carried by said bar, cultivating element supporting frames connected to said rods, springs connected to said frames and said rods, cultivating elements connected to the lower rear ends of said frame, and a hand lever connected to said rods for moving said cultivating elements into or out of a cultivating position.

In testimony whereof I affix my signature in presence of two witnesses.

GEORGE C. LEWIS.

Witnesses:
 WM. SIMPSON,
 WM. MAHONEY.

Copies of this patent may be obtained for five cents each, by addressing the "Commissioner of Patents. Washington, D. C."